US009536163B2

(12) United States Patent
Veeser et al.

(10) Patent No.: US 9,536,163 B2
(45) Date of Patent: Jan. 3, 2017

(54) OBJECT POSITION AND ORIENTATION DETECTION SYSTEM

(75) Inventors: Stefan Veeser, Livingston (GB); David Cumming, Livingston (GB)

(73) Assignee: OXFORD AI LIMITED (GB)

(*) Notice: Subject to any disclaimer, the term of this patent is extended or adjusted under 35 U.S.C. 154(b) by 1169 days.

(21) Appl. No.: 12/513,739

(22) PCT Filed: Nov. 12, 2007

(86) PCT No.: PCT/GB2007/004319
§ 371 (c)(1),
(2), (4) Date: Dec. 10, 2009

(87) PCT Pub. No.: WO2008/056180
PCT Pub. Date: May 15, 2008

(65) Prior Publication Data
US 2010/0091112 A1    Apr. 15, 2010

(30) Foreign Application Priority Data

Nov. 10, 2006 (GB) .................................. 0622451.3

(51) Int. Cl.
*H04N 5/225* (2006.01)
*H04N 5/228* (2006.01)
(Continued)

(52) U.S. Cl.
CPC ........... *G06K 9/3216* (2013.01); *G01B 11/002* (2013.01); *G06F 3/017* (2013.01); *G06F 3/0325* (2013.01);
(Continued)

(58) Field of Classification Search
USPC .... 348/135–140, 169–172, 208.14; 382/123, 382/181, 209, 199, 203, 216
See application file for complete search history.

(56) References Cited

U.S. PATENT DOCUMENTS 6,148,270 A * 11/2000 Nakajima ............ G01B 11/026
356/620
6,658,149 B1 * 12/2003 Wakahara et al. ............ 382/215
(Continued)

FOREIGN PATENT DOCUMENTS

CN          1570547       1/2005
JP       2005-055177  *  3/2005
(Continued)

OTHER PUBLICATIONS

Regenbrecht, H.T., et al, "A Cable-less Interaction Device for AR and VR Environments", Proceedings of ISMR, 2001; pp. 151-152.

Primary Examiner — Aung S Moe
Assistant Examiner — Euel Cowan
(74) Attorney, Agent, or Firm — Dickinson Wright PLLC

(57) ABSTRACT

An object position and orientation detection system and in particular one which is capable of describing observed movement in 3 dimensions. In one example, a spherical patterned marker with concentric rings is imaged using one or more digital cameras, and the resulting images are processed to determine the position and orientation of an object to which the patterned marker is attached. The method of optical tracking employed by the system allows motion to be determined in six degrees of freedom. In conjunction with a suitable display, such as a projector, an interactive white board or similar application can be realized.

19 Claims, 13 Drawing Sheets

(51) Int. Cl.
- *H04N 7/18* (2006.01)
- *G06K 9/32* (2006.01)
- *G01B 11/00* (2006.01)
- *G06F 3/01* (2006.01)
- *G06F 3/03* (2006.01)
- *G06F 3/0346* (2013.01)
- *G06F 3/0354* (2013.01)
- *G06F 3/042* (2006.01)
- *G06F 3/044* (2006.01)
- *G06K 9/20* (2006.01)

(52) U.S. Cl.
CPC ......... *G06F 3/0346* (2013.01); *G06F 3/03545* (2013.01); *G06F 3/044* (2013.01); *G06F 3/0425* (2013.01); *G06K 9/2036* (2013.01)

(56) References Cited

U.S. PATENT DOCUMENTS

| | | | |
|---|---|---|---|
| 6,724,930 B1 | 4/2004 | Kosaka et al. | |
| 6,754,915 B2 * | 6/2004 | Mistarz | E04H 4/1218 4/507 |
| 2002/0001398 A1 * | 1/2002 | Shimano et al. | 382/104 |
| 2003/0218615 A1 * | 11/2003 | Gelb | 345/555 |
| 2004/0002642 A1 | 1/2004 | Dekel et al. | |
| 2004/0155962 A1 * | 8/2004 | Marks | 348/169 |
| 2004/0183926 A1 * | 9/2004 | Fukuda | H04N 5/265 348/239 |
| 2004/0190766 A1 * | 9/2004 | Watanabe et al. | 382/154 |
| 2005/0013477 A1 * | 1/2005 | Ratti et al. | 382/154 |
| 2006/0012830 A1 * | 1/2006 | Aiso | G06T 3/4053 358/3.27 |
| 2006/0058946 A1 * | 3/2006 | Chappell | G01C 21/16 701/500 |
| 2006/0210260 A1 * | 9/2006 | Yata | 396/147 |
| 2007/0014489 A1 * | 1/2007 | Sun | G06T 7/0012 382/294 |
| 2007/0018975 A1 * | 1/2007 | Chuanggui | A61B 90/36 345/419 |
| 2007/0296845 A1 * | 12/2007 | Watanabe | H04N 1/00307 348/333.12 |
| 2008/0112592 A1 * | 5/2008 | Wu | A61B 5/1113 382/103 |
| 2008/0219501 A1 * | 9/2008 | Matsumoto | G06T 7/2046 382/103 |

FOREIGN PATENT DOCUMENTS

| | | |
|---|---|---|
| WO | WO 94/05969 | 3/1994 |
| WO | WO 01/38823 | 5/2001 |

* cited by examiner

SMALL SHIFT IN POSITION OF REAL PATTERN

CORRESPONDING CHANGE IN DETECTED PIXEL PATTERN

RECOVER EXACT SUBPIXEL POSITION FROM PIXELATED
PATTERN BY FITTING ARTIFICIAL CONTINUOUS PATTERN

OBJECT POSITION AND ORIENTATION DETECTION SYSTEM

CROSS REFERENCE TO RELATED APPLICATIONS

The present application is a 35 U.S.C. §371 national stage filing of International Patent Application No. PCT/GB2007/004319, filed Nov. 12, 2007, and through which priority is claimed to Great Britain Patent Application No. 0622451.3, filed Nov. 10, 2006.

The present invention relates to an object position and orientation detection system and in particular one which is capable of determining observed movement in 3 dimensions.

Interface devices which allow writing into a projected image using a touch sensitive surface spread across a board are known. However, the level of interactivity with such devices is limited to little more than can be achieved with a standard desktop mouse. Such systems are also expensive and require additional hardware purchases to bring them into effect.

It is therefore an object of embodiments of the present invention to provide an object position and orientation detection system that can function without requiring additional expensive hardware.

SUMMARY OF THE INVENTION

In accordance with a first aspect of the invention there is provided an object position and orientation detection system comprising:

an object, at least part of which comprises a patterned marker having a detectable pattern arranged thereon;

imaging means adapted to create one or more image of the object; and image processing means adapted to calculate the position and orientation of the object in space from the position and orientation of the patterned marker.

Preferably, the position and orientation of the object are calculated in real time.

This system can represent an efficient object position and orientation detection device, as it can monitor the trajectory and orientation (with 6 degrees of freedom) of the object, when moved around and turned in 3D space.

Preferably, the pattern as viewed by the imaging means changes dependent on the orientation of the patterned marker relative to the imaging means.

Optionally, the pattern as viewed by the imaging means changes dependent on the position of the patterned marker relative to the imaging means.

Preferably, the pattern as viewed by the imaging means is used to convey the position and orientation of the device relative to a surface.

Optionally, this is based on a calibration procedure which does not involve an interaction with the pattern, only an interaction between the imaging means and a calibration image on the surface.

Preferably, the patterned marker is substantially spherical. Optionally, the patterned marker consists of a single sphere.

Preferably, the image processing means detects a feature of the pattern on the patterned marker which is dependent upon the orientation and position of the pattern relative to the camera.

Preferably, the pattern on the spherical patterned marker comprises a set of rings around the sphere which create a variety of patterns depending on the orientation of the sphere with respect to the imaging means.

Preferably, the patterned marker is hollow with a surface adapted to diffuse light.

Preferably the surface comprises celluloid.

Preferably, the surface has a matt finish.

Optionally, the pattern is enhanced by illuminating it with a light source.

Preferably, the surface of the patterned marker and the material from which the marking is made have the same reflective properties, but different transmission properties.

Preferably, the pattern is made detectable by the imaging means by illuminating it with a light source.

Preferably, the light source is a point light source.

Preferably, the light source is positioned behind the patterned marker.

Preferably, the light source provides infra red illumination.

Optionally, the light source provides visible illumination.

Optionally, the light source provides ultraviolet illumination.

Preferably, the imaging means is configured to detect the illumination provided by the light source.

Preferably, the imaging means is provided with an optical filter.

Preferably, the optical filter is a band pass filter which prevents the imaging means from receiving electromagnetic radiation at frequencies other than those provided by the light source.

Alternatively, the optical filter is a low pass or high pass filter, or other filter selected to reduce transmission of frequencies other than those of the light source.

Preferably, the pattern can be switched on and off.

Preferably, the pattern is not detectable when the light source is switched off.

Preferably, the system uses the switching to communicate information to the computer system.

Preferably, the information may be used to select a computer function.

Optionally, the information may be used to convey the position and orientation of the device relative to a surface.

Preferably, the image processing software further comprises matching software which matches an artificial pattern to the pattern in the image.

Preferably, the position, size and orientation parameters which define the artificial pattern can be fine-tuned until it correlates best with the pattern in the image.

In accordance with a second aspect of the invention there is provided a method for operating an object position and orientation detection device, the method comprising the steps of:

creating one or more images of an object, at least part of which comprises a patterned marker having a detectable pattern arranged thereon;

and calculating the position and orientation of the object in space from the position and orientation of the patterned marker from respective images.

Preferably, the position and orientation of the object are calculated in real time.

Preferably, the pattern changes dependent on the orientation of the patterned marker in respective images.

Optionally, the pattern changes dependent on the position of the patterned marker in respective images.

Preferably, the patterned marker is substantially spherical.

Preferably, the method further comprises detecting features of the pattern on the patterned marker which are dependent upon one or both of the orientation and position of the pattern relative to the camera.

Preferably, the pattern on the spherical patterned marker comprises a set of rings around the sphere which create a variety of patterns depending on the orientation of the sphere with respect to the imaging means.

Preferably, the patterned marker is hollow with a surface adapted to diffuse light.

Preferably the surface comprises celluloid.

Preferably, the surface has a matt finish.

Preferably, the surface of the patterned marker and the material from which the marking is made have the same reflective properties, but different transmission properties, Preferably, the method further comprises illuminating the pattern with a light source to allow detection of the pattern.

Preferably, the light source is a point light source.

Preferably, the light source is positioned behind the patterned marker

Preferably, the light source provides infra red illumination.

Optionally, the light source provides visible illumination.

Optionally, the light source provides ultraviolet illumination.

Preferably, the method further comprises optical filtering.

Preferably, a band pass filter is used to prevent imaging of electromagnetic radiation of frequencies other than those provided by the light source.

Preferably, the pattern can be switched on and off.

Preferably, the pattern is not detectable when the light source is switched off.

Preferably, switching communicates information to the computer system.

Preferably, the information may be used to select a computer function.

Optionally, the information may be used to convey one or both of the position and orientation of the device relative to a surface.

Preferably, the method further comprises matching an artificial pattern to the pattern in the image.

Preferably, the position, size and orientation parameters which define the artificial pattern can be fine-tuned until it correlates best with the pattern in the image.

Preferably, the artificial pattern is represented by a formula parameterized with continuous values for position, size and orientation.

Preferably, the intensity of the artificial pattern can be calculated for any point in a continuous image space for any given set of parameter values using the formula.

Preferably, the calculation for the artificial pattern can be used to determine a similarity measure between the continuous artificial pattern and the pattern in the pixellated image. Further determinations of a gradient of this similarity measure can be defined in continuous parameter space.

Preferably, the automatic fine tuning of the match uses the gradient of a similarity measure to find the best fit.

Preferably, stages of the matching algorithm use a coarse-to-fine fitting method.

Preferably, the algorithm uses a cascade, i.e. a stagewise subselection of an initial set of candidate matches.

In accordance with a third aspect of the invention there is provided an object position and orientation detection device comprising a patterned marker wherein the pattern is detectable by an imaging means in successive images in order to detect changes in one or both of an orientation and a position of the device.

Preferably, the patterned marker is substantially spherical.

Optionally, the patterned marker consists of a single sphere.

Preferably, the pattern on the spherical patterned marker comprises a set of rings around the sphere which create a variety of patterns depending on the orientation of the sphere with respect to the imaging means.

Preferably, the patterned marker is hollow with a surface adapted to diffuse light.

Preferably the surface comprises celluloid.

Preferably, the surface has a matt finish.

Preferably, the surface of the patterned marker and the material from which the marking is made have the same reflective properties, but different transmission properties, Optionally, the pattern is enhanced by illuminating it with a light source.

Preferably, the pattern is made detectable by the imaging means by illuminating it with a light source.

Preferably, the light source is a point light source.

Preferably, the light source is positioned behind the patterned marker.

Preferably, the light source provides infra red illumination.

Optionally, the light source provides visible illumination.

Optionally, the light source provides ultraviolet illumination.

Preferably, the pattern can be switched on and off.

Preferably, the pattern is not detectable when the light source is switched off.

Preferably, the device uses the switching to communicate information to the computer system.

Preferably, the information may be used to select a computer function.

Optionally, the information may be used to convey one or both of the position and orientation of the device relative to a surface.

Preferably, the device further comprises a pointer extending from the patterned marker.

Preferably, the light source is attached to the pointer.

Alternatively, the light source is located within the sphere.

BRIEF DESCRIPTION OF THE DRAWINGS

The present invention will now be described by way of example only and with reference to the accompanying drawings in which.

EXAMPLES OF THE INVENTION

Figure 1:
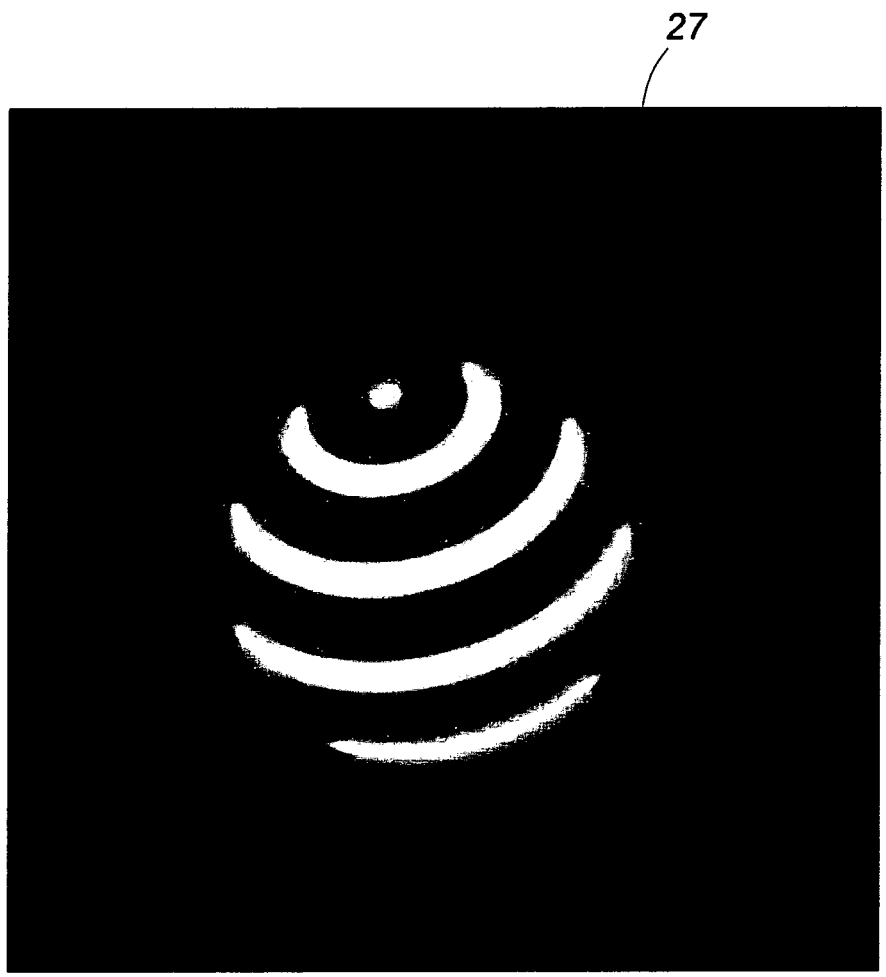
FIG. 1 is an example of an artificially generated pattern of a sphere used in an embodiment of the present invention.

An embodiment illustrating the interface device 1 of the present invention is presented (with reference to FIGS. 3, 4, 5 and 8) which consists of a modified web camera 3 and a cylindrical pen 5 (the input device) with a 55 mm sphere 7 attached to the non-writing end. The sphere 7 has a ring 9 marked onto its surface along the equator, and other rings 11 parallel to the equator 9 repeating to the "north" 13 and "south" 15 poles of the ball 7.

Note that this embodiment describes using a modified web camera but it is of course envisaged that any camera could be employed for this purpose, for example a dedicated infrared camera could be used, or any camera tailor made to record images of the patterned marker in question.

The pen 5 contains a small battery 17 which supplies power to two LEDs 19 which in turn illuminate the stripe pattern on the ball 7. (Note that in practice this could be one or several LEDs). The LEDs 19 emit infrared light which means the pattern is detectable only in the infrared domain and not visible to humans. The web camera is modified to detect images in the infrared spectrum by changing the filter in the camera (which generally blocks infrared light and lets visible light pass) to a suitable filter (e.g. band-pass) selected to block visible light and let infrared light pass.

When button (A) 21 is pressed, the illumination is switched on so that the camera can detect the pattern. Additionally, when the pen 5 touches a surface, button (B) 23 is activated which likewise switches the illumination on to make the pattern detectable by the camera. It is envisaged that such a pen 5 might in actual fact have either or both of these buttons 21,23, or additional buttons, dependent on the requirements of the application.

The parabolic reflector 25 directs the infrared light into the sphere 7, and the pattern can thus be illuminated quite brightly. Thus, the exposure time required for the camera to obtain a useful image of the pattern can be reduced significantly. This has a number of advantages, firstly that the relative brightness of the pattern in comparison to the background means that the image of the pattern may consist of the pattern alone on a black background. Of equal importance however is that reducing exposure times means a significant reduction in, and potentially elimination of, blurring as might be induced by motion.

The sphere 7 acts as a spherical diffuser which prevents the occurrence of highlights. In this embodiment the spherical diffuser is a table tennis ball; the celluloid material from which it is made is found to be a good diffuser for the purposes of obtaining an even light distribution across the sphere.

The pattern on the sphere 7 is marked using a layer of light blocking material such as a thin layer of metal. As metal has the unwanted property of mirroring light, generating highlights, a second thin layer of plastic can be used to cover the metal.

In an alternative embodiment (not shown) the pattern on the sphere is formed by application of a suitable coating which reduces the transparency of the surface to infrared light. Instead of a discontinuous square-wave type banded pattern, the coating can increase and decrease in transparency in a sinusoidal or other continuous pattern. This may improve detection. The coating may be applied to the interior surface of the sphere so that the pattern is only visible to the camera when the infrared light source is switched on. This also has aesthetic value as there will be no banding visible on the exterior of the sphere.

Figure 2:
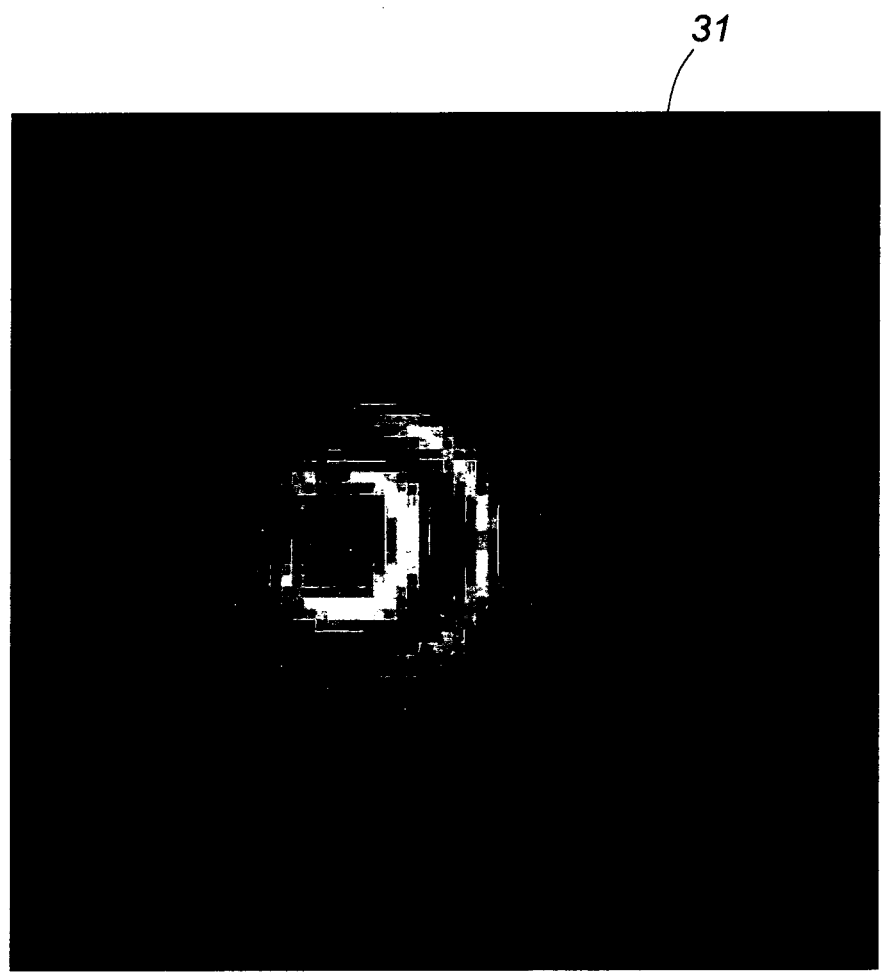
FIG. 2 is an example of an image of a real patterned sphere seen through the camera with infrared illumination as used in an embodiment of the present invention.
Figure 3:
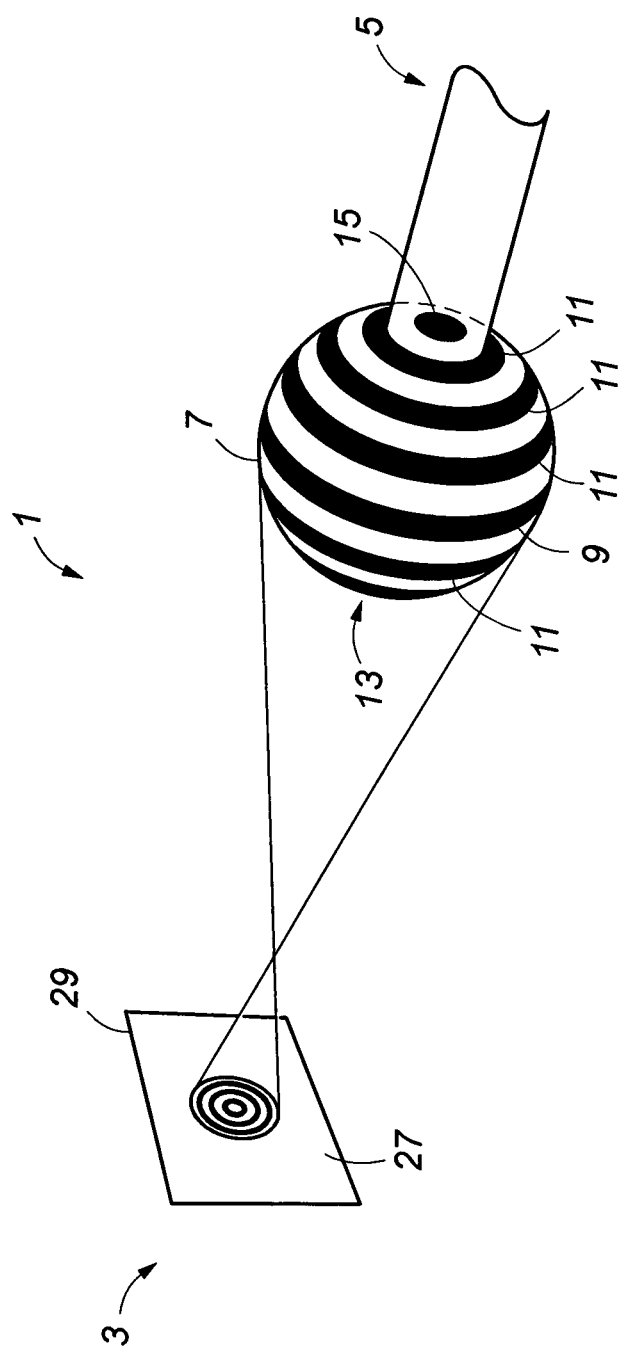
FIG. 3 is a perspective view of an example of an interface apparatus directed towards the camera in accordance with the invention.
Figure 4:
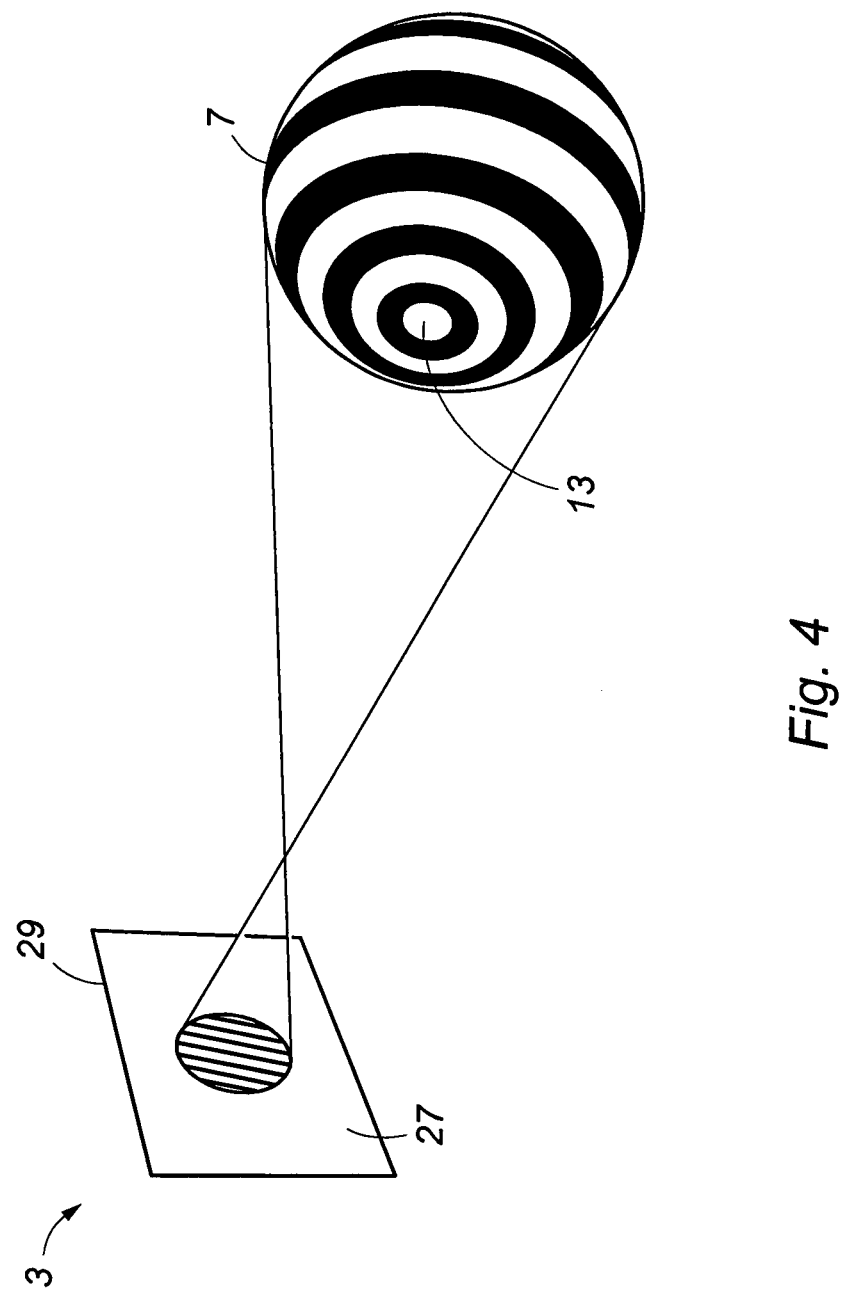
FIG. 4 is a perspective view of an example of a patterned marker, directed perpendicularly with respect to the example in FIG. 3, in accordance with the invention.

Software associated with the interface apparatus employs a mathematical model describing the sphere 7, camera 3 and light rays travelling from the sphere 7 toward the camera 3 and produce a projected image 27 of the sphere 7 on the sensor chip 29 (see FIGS. 3 and 4). With this model it is possible to artificially generate a projected image 27 of the sphere for any location and orientation in the field of view of the camera (see FIG. 1 for example). These artificial images or patterns can then be matched to or correlated with the real image 31, i.e. the image of the sphere 7 formed on the sensor chip 29 (see FIG. 2) and by finding the best match the correct location and orientation of the real sphere is determined.

To indicate when the pen 5 is touching the wall, communication between the interface device and the computer 33 preferably relies only on interaction between the pattern and the camera 3. This is also the case where the device is used as a mouse-like input device, i.e. communicating when a click is issued.

While the LEDs are switched off, no pattern is detected by the modified webcam. However, for example when the button (A) 21 is pressed, or when button (B) 23 is actuated by placing the tip of the device on the surface, the illumination switches on and the webcam 3 detects the pattern. Therefore a click is simply communicated as a change from a 'pattern not detected' to 'pattern detected' state.

The reverse situation may also be employed, that is with the LEDs on by default, when the button (A) 21 is pressed or when button (B) 23 is actuated the illumination is switched off. A click is then communicated as a change from 'pattern detected' to 'pattern not detected'—the last recorded position of the device indicating where the click should be effected.

Figure 8:
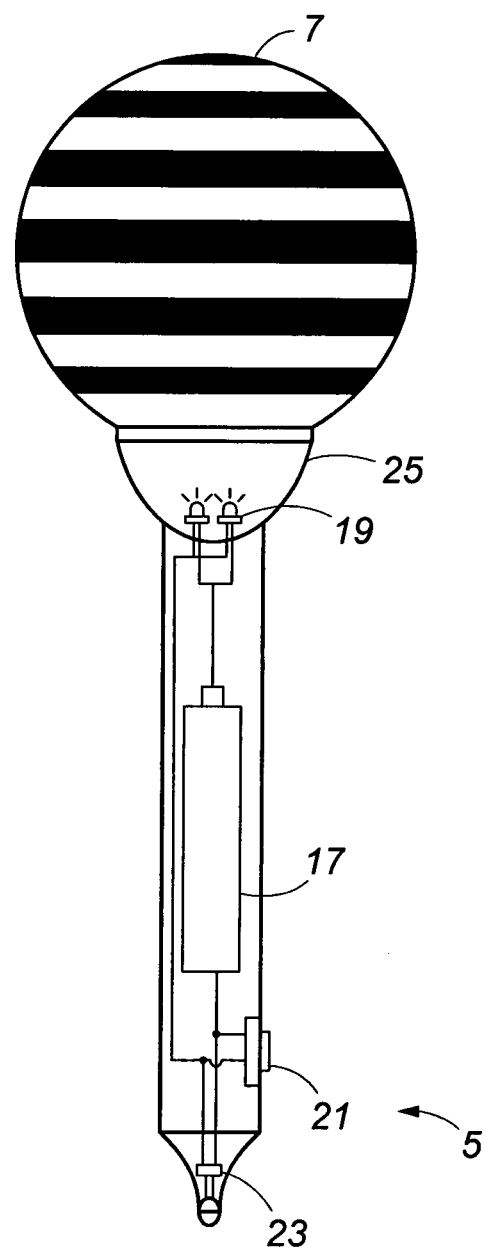
FIG. 8 is a detailed side view of the "magic pen" illustrated in FIG. 5.

A particular application of the invention is as a "magic pen" exemplified in FIG. 8. The arrangement of the buttons depends on the application but for this embodiment, two locations are used. One button (A) 21 is on the surface at the front of the pen to be pressed with the index finger when the pen is used to simulate a spray paint device. The other button (B) 23 is in the tip of the pen and actuated on application of pressure such as the kind one uses to draw with a real pen which the "magic pen" simulates.

Secondly, the surface of the sphere 7 and the material providing the pattern are selected to have similar reflective properties (e.g. the same colour), but different transmission properties, e.g. the celluloid material of the table tennis ball transmits light whereas the patterning material blocks it. This way the pattern is only detectable when the LEDs illuminate the surface of the sphere between the opaque bands.

Another advantage gained by brightly illuminating the sphere by means of an active infrared light source behind the pattern is that it allows the pattern to be simple without being confused with other patterns which are not as bright in the infrared region of the electromagnetic spectrum. As mentioned above, this also reduces blurring of the camera image.

Although similar patterns might be around in the background, it is unlikely for them to appear as brightly on the webcam image as the pattern itself. The camera's exposure settings can effectively be reduced to the point that the image consists of a mostly black or very dark background showing only light sources or strongly reflective objects at a normal brightness level.

The choice of an infrared light source also reduces the possibility for confusion with bright patterns such as those appearing on a computer monitor or in the projected image from a digital projector, as these contain mainly light in the visible spectrum and produce only very weak (or indeed no) infrared output. The choice of infrared also has the effect that the pattern is invisible to the human observer.

The benefit of adopting a spherical diffuser is that a sphere always appears as a circular (or very slightly elliptical) disk in the camera image, irrespective of the direction in which it is viewed. Secondly the regular bands or rings around the sphere result in a variety of patterns on the disk image dependent on the orientation of the sphere relative to the camera (see FIGS. 3 and 4). If the axis of the sphere points directly at the camera the pattern appears as series of concentric circles (FIG. 3). At the other extreme, if the axis of the sphere is directed perpendicularly to the line of sight of the camera, the pattern appears as a series of parallel stripes (FIG. 4). With the described pattern (also see FIG. 2) any possible orientation of the sphere in 3 dimensions can be detected from its 2 dimensional projection in the camera image.

The position of the sphere 7 in three dimensions is determined as follows. The size of the disk increases or decreases inversely linearly as the distance between the sphere 7 and the camera 3. The size of the disk in the image can therefore be used to determine the distance to the sphere in the direction of the optical axis of the camera. The location of the disk in the image in the left/right and up/down directions gives information relating to where the sphere is located in the vertical or horizontal direction relative to the camera. These may be calculated using formulas which are well known to the skilled person, knowledge of the viewing angle of the camera (relative to the screen) and any distortion by the lens of the camera assisting in this determination.

The pattern of rings was designed to have a common property independent of the orientation it might have relative to the camera. Given the projected image of the patterned sphere in an arbitrary orientation, either a vertical or a horizontal line can always be drawn through the centre of the disk such that said line will dissect at least 8 borders between dark and light. Moreover these borders will appear to be approximately regularly spaced. Computationally it is quick to search for horizontally or vertically linear successions of black and white segments in an image. The resulting detection might provide some false locations, however among these will always be the correct one. This method therefore works well as a preselection of candidate positions. Later detection stages which are more accurate but much slower only need to be applied to this short list.

Fast detection is not a trivial algorithmic task because of the variability of the pattern, which changes when the orientation of the sphere is changed. The naïve approach, adopted in some of the known prior art, of searching the whole image for all possible appearances of the sphere is computationally expensive and an unnecessary waste of processing time.

The method is sometimes known as a cascade or staged filtering, where a lot of unlikely candidates for the solution of a problem are rejected early in the process after only a very brief examination. In the later stages the examination becomes more sophisticated but is applied to less and less candidates such that the best solution is finally derived with reasonable speed.

Sub pixel accuracy, which is needed in order to achieve the necessary accuracy over a reasonable range of positions with a web cam of standard VGA resolution, is achieved by matching an artificial pattern 27 (see for example FIG. 1) to the pattern in the image 31 (for example FIG. 2). The position, size and orientation parameters which define the artificial pattern can be fine-tuned to sub pixel accuracy until it correlates best with the pattern.

The artificial pattern is represented by a formula, which is derived from the mathematical model for the projection of the patterned sphere onto the camera chip. The formula allows the intensity of the artificial pattern to be calculated at any point in continuous image space for a given position, orientation and size of the patterned sphere. Position, orientation and size form the continuous parameters of the formula.

Due to the continuity of the parameters in the formula it is possible to use the formula to define a similarity measure between the artificial and real pattern whose gradient is well defined in continuous parameter space. The fine tuning of the match can then be done using gradient based methods which generally are very fast and can be run up to almost arbitrary accuracy.

Figure 5:
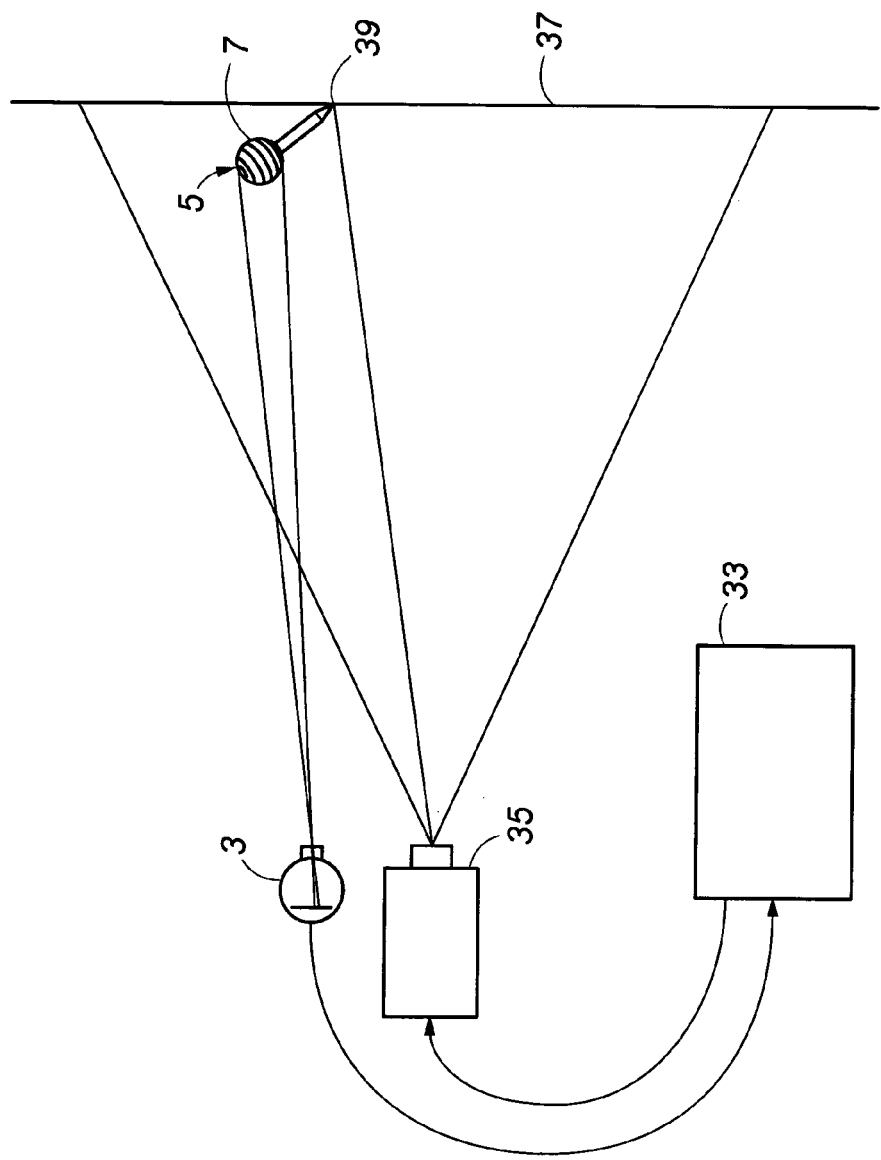
FIG. 5 shows an example of an alternative interface apparatus used as a writing implement in accordance with the invention.

With reference to FIGS. 3, 4 and 5 (demonstrating an example of the OPODD), a digital projector 35 is setup in the usual manner to project computer display content onto a projection surface 37, e.g. a white wall. The user holds the "magic pen" 5 (discussed in detail above with reference to FIG. 8) with the tip touching the wall at a location 39 within the projected image with the intent of effecting a mouse click or drawing into a drawing program which is the subject of the projected window. A webcam 3 modified as discussed herein is placed near the digital projector 35 such that its field of view coincides approximately with the projected image. The position of the user is such that he does not obscure the sphere 7 at the end of the pen 5 from the view of the camera 3. It is observed that in practice the user naturally avoids blocking the camera as he actively positions himself so as not to block the projection—otherwise he would not be able to see what he was writing or drawing.

Initially a calibration procedure establishes the exact position of the projected image relative to the camera. The calibration procedure described in the following text is one example from a variety of possible related calibration procedures. The purpose of the calibration procedure is to establish the position of the device in relation to the projected image. This information is necessary in order to switch on the appropriate pixel under the tip of the magic pen when drawing or, in the case of where the pen is used for virtual spray painting, to switch on the pixel or pixels where the extended line or cone from the pen intersects the projected image.

A number of cross hairs are displayed in the projected image with a target pixel at the intersection of the cross. The cross hairs are evenly distributed across the projected image. The crosshairs are displayed one at a time with the rest of the image blank. For each cross hair that is displayed the user is required to place the pen right over the target pixel at the intersection of the cross and hold it there for a predetermined duration.

It is advantageous to the efficacy of the calibration process if the orientation of the pen is varied while keeping the tip of the pen fixed on the cross-hair. Meanwhile the system determines a set of camera-centred coordinates for the tip of the pen, which will vary slightly around the true location of the tip of the pen due to the variation in the orientation of the pen. When enough samples are collected for the current crosshair, the average tip location is calculated and paired up with the target pixel's coordinates within the image.

After that another crosshair is displayed and the procedure repeats until an array of pairings of cross-hair coordinates and camera-centred tip coordinates is collected. The list of paired up coordinates is then used to calculate a set of parameters to determine a transformation from pen tip coordinates into pixel coordinates. This transformation is later used for drawing and pointing. In effect, this process reveals the orientation of the real world screen in the camera coordinate system.

Figure 10:
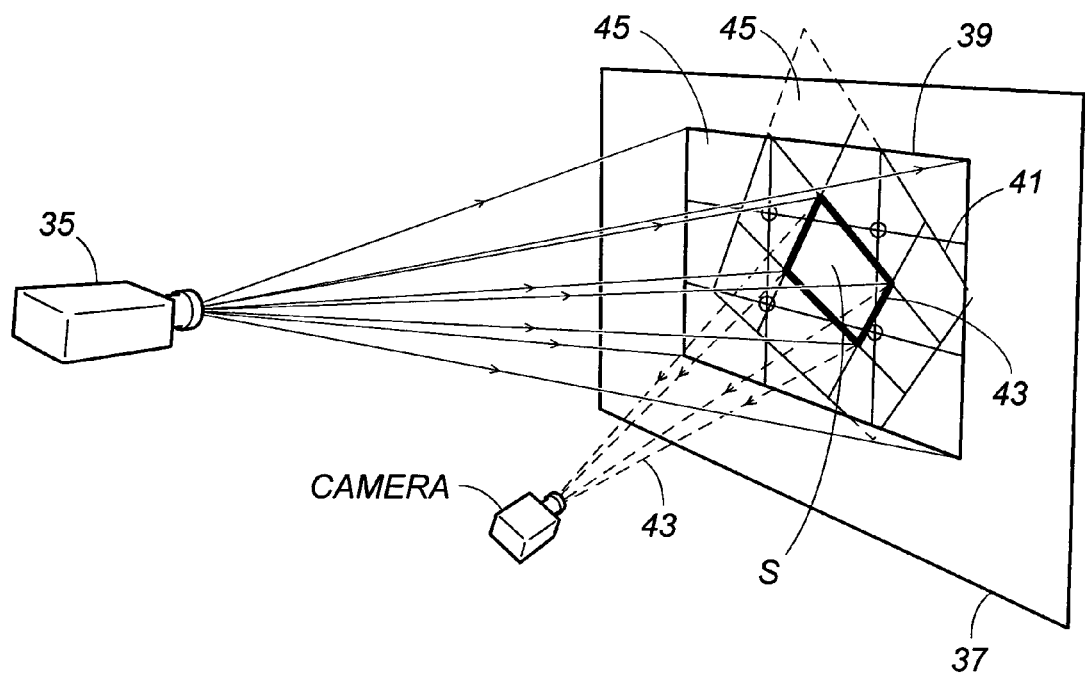
FIG. 10 illustrates a "virtual torch" method for calibrating and orienting a camera in accordance with aspects of the present invention.
Figure 10:
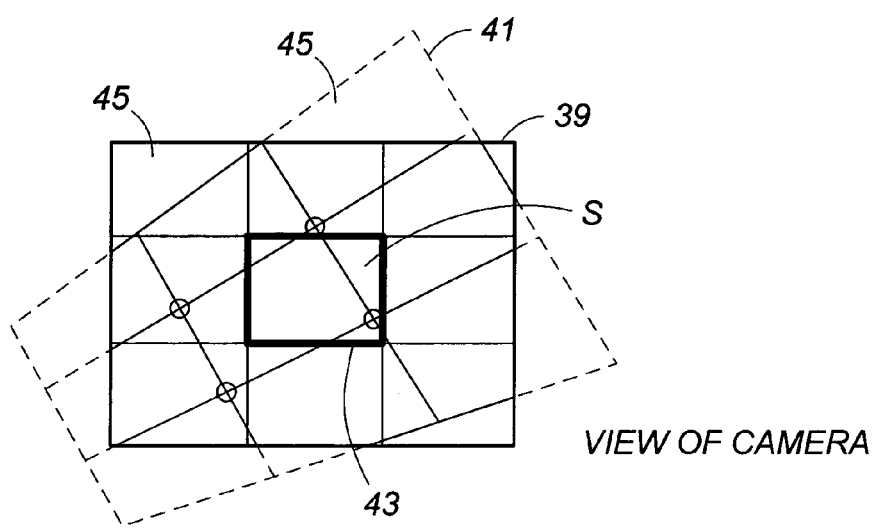

An alternative, more elegant calibration method is effected as follows, with reference to FIG. 10. In this alternative the calibration information is obtained directly from an interaction between the camera 3 and the display 37. A calibration pattern 39 is displayed on screen and is detected by the camera 3. Analysis of the pattern as it appears in the camera image 41 is then used to gain knowledge about the spacial arrangement of the screen 37. This information is sufficient to allow the drawing function of the pen. In essence the orientation and location of the screen is derived in a similar process as is used for the detection of the orientation and location of the pen.

A basic problem with this approach however is that in some cases the camera may have been adapted with an optical filter to be "blind" to what is displayed on the screen in order to facilitate the detection of the pen (e.g. in the infrared region).

A simple way to overcome this problem is to make use of the different colour channels in a typical CCD web camera. Note that these channels are specialized to be sensitive to certain visible light (i.e. red, green and blue) however all of them are also sensitive for infrared. Now it is possible to raise the frequency threshold of the filter which initially blocked all the visible light and only let infrared light pass. This can be done to the effect that only blue and green frequencies remain blocked but red together with infrared passes. The blue and green channels then represent the image only in infrared and can be used to detect the pen, whereas the red channel will show the contents of the screen as well and can be used for calibration.

In the present calibration method it is not necessary to know the exact arrangement of the projector, screen and camera to realize pen drawing. The only information needed is a point-to-point correlation or mapping between the points in the original image and the image returned from the camera watching the projection of the original image. The mapping can be seen as a distortion of the original image in the view of the camera as illustrated in the inset in FIG. 10.

Note that the only information we need in order to achieve pen drawing is the pixel which is projected under the tip of the pen. We can detect the position of the tip of the pen in camera centred coordinates from the pattern as described elsewhere in the specification. We can then calculate where the line from the tip of the pen through the camera pinhole hits the CCD chip and therefore determine the exact point in the camera image where the tip of the pen is located. Finally we simply use the mapping to find the corresponding point in the original image and switch the nearest pixel to create the illusion that the tip of the pen marked the screen. This method works under the assumption that the tip of the pen contacts the screen, however this assumption normally holds because the patterned marker on the back of the pen only lights up when the button in the tip of the pen is pressed against the screen.

In order to determine the mapping we start again with a mathematical model of the light rays. This time the model describes how the light rays emerge from the projector, hit the surface of the screen and are reflected onto the CCD chip of the camera. Using this model it can be demonstrated that the distortion an image undergoes from its projection onto the screen and its subsequent detection by the camera CCD chip can be represented by a mapping which is fairly simple (for a flat surface) and only involves seven parameters. Note that the distortion can be non-trivial, as the projector and the camera can be at an angle to the screen. However, the values of the parameters for this mapping can be determined if it is known how the distortions act on at least four points in the image. In other words if we know how four points map, we can extrapolate and determine how all of the points on the image are mapped.

There are many techniques the skilled person can use to acquire information about how points are mapped. One way is to project a black image with a number of white disks, crosses or similar shapes centred on a number of defined points. We will call these shapes calibration markings in the following. The centres of these markings can then be detected in the camera image with suitable algorithms and paired up with the points from the original image.

Note that in order to derive the mapping it is of advantage to acquire more than four pairs of corresponding points. The additional information gained can then be used to reduce the error introduced by noise and pixellation using suitable algorithms known to the skilled person.

Another important part of the setup for the magic pen arrangement is to orient the camera appropriately, such that the back of the pen is always in the field of view of the camera while in use. Without software support this is a difficult process, as it involves watching the camera feed on screen while directing the camera manually until all the projected area is in view—the motion involved in handling the camera does not intuitively correspond to the motion caused in the camera feed. This is because things in the camera feed move in the opposite direction from the direction in which the camera is moved.

It turns out that there is an elegant solution to this problem as well. The concept is to turn the camera into a "virtual torch", but without attaching any lamps or electronics to the camera, simply by calculating where the camera points and then use the light as it comes from the projector to create the illusion 43 of a beam hitting the screen from the direction of the camera. It is then very easy for the user to point the camera as if it was a torch until the beam overlaps a displayed target, in effect turning the camera into a virtual torch with illumination provided by the projector but manipulated by the camera.

The calculation to create this illusion is straight forward and uses the mapping as outlined for the calibration. Imagine the camera image divided into 3×3 equal squares (e.g. 45). The inner square will then be "projected outwards" from the pinhole like a "rectangular beam" onto the screen. Note that the shape of this projection will be non rectangular if the camera points towards the screen at an angle (see FIG. 10). In order to calculate the exact polygon of the correct projection it is enough to apply the mapping onto the corner points of the inner square S in the camera image, and connect the resulting points in the original image with lines and fill the inner area with a bright colour.

The final requirement is that this process has to be repeated real-time at maximum camera frame rate in order to achieve the torch illusion. Note that the calibration mapping becomes invalid anytime the camera is moved or turned and therefore needs to be recalculated for each frame in the camera video stream. This means that the calibration markings, which allow the detection of the mapping (see above) need to be displayed together with the beam illusion. This could potentially create two problems; 1) The calibration markings might spoil the beam illusion for the user and 2) the beam illusion moves around on screen and potentially obscures the calibration markings making detection more difficult.

However these problems can be solved by; 1) arranging the calibration markings such that they can double function as guides/indicators for where to point the beam exactly—in our setting they would indicate again the inner square of the screen and 2) if the beam illusion is displayed as green or blue, it will not be visible in the red calibration channel and can therefore not interfere with the detection of the calibration markings, which should be displayed with a colour containing red (for example white).

Note that the division of channels has several other useful application. Once the pen's location and orientation are detected using the exclusively infrared sensitive blue and green channels of the camera it is possible to analyse the appearance of the pen in the visible (red) channel. The pen could be marked with another, secondary, pattern which only shows up in the visible domain and therefore does not affect the IR visible pattern. This pattern can be used to transmit additional information. Such information could for example be used to identify and track multiple pens which might be drawing at the same time. Or it might be used to assign a fixed drawing colour to different pens. Or it could be used to get another independent precision estimate on the position and orientation of the pen to reduce the detection error even further. Alternatively, it can be used to detect the rotation around the third axis for which the infrared pattern is invariant (along the axis of the pen). This is especially useful if the device represents an elongated object where the radial symmetry is broken (e.g. a tennis racket or golf club for a game).

Additionally, instead of a secondary pattern another LED at a different wavelength can be employed to illuminate the original pattern more brightly in the red channel. Depending on whether this extra illumination is detected in the red channel different kinds of "clicks" can be distinguished (e.g. simulating a left-click or a right-click of a PC mouse).

Once the system is calibrated, the camera starts sending a continuous video stream of images to the computing device which continuously refreshes the projected image. The computing device runs software (discussed in more detail above and below) to analyse the video stream from the camera frame by frame. For each frame it detects the parameters of the image of the sphere and its pattern. This information is first transformed into the 3 dimensional location and orientation of the sphere relative to the camera and then into the location of the tip of the pen relative to the camera. Using information from the calibration the exact pixel at which the pen is pointing within the projector image is identified. The next image sent to the projector is then altered appropriately, e.g. the identified pixel is changed to the current ink colour of the pen. With the correct frame rate the delay between detection of the pen and changing the pixels in the projected image becomes unnoticeable and the user is given the impression that he or she is actually drawing onto the wall.

With the location of the pen tip known, in addition to whether the tip is touching the wall/screen or not, all typical functions which normally work with a mouse in a standard graphics/drawing software package can be made to work with the pen. Applications such as drawing, erasing, drag/drop, selecting by framing, the placement and manipulation of geometric objects such as circles and rectangles, the placement and shaping of bezier curves, even text input (by "typing" with the pen on a displayed keyboard) can be made possible. The advantage of the pen over the mouse, to be essentially physically located where the change in the image is occurring, promises to allow the positioning and manipulating of objects in the image to be much more intuitive and precise.

The manipulation of virtual objects can even be extended into the $3^{rd}$ dimension because, as discussed herein, the location of the tip of the pen can be accurately determined in 3D. With this information it is possible to use the pen in conjunction with 3D modeling software applications such as CAD. By way of illustration, a 3D object displayed in CAD software could adopt the orientation and position from which it is viewed from the orientation and location of the pen. It would then be very intuitive to view an object from all sides; spinning, dragging and dropping it in 3D, picking up other 3D objects, viewing them from a variety of angles, combining them, etc. Actual building in 3D with virtual bricks and/or building components/modules is also possible. There are many other applications relating to the manipulation of objects in a virtual world which can be realised.

Using a special image projection technique, 3D objects can be displayed in a manner such that they appear to connect with or be manipulated by the pen in real space in the field of vision of the user. In order to achieve this 3D illusion, a different image has to be detected by the right eye from the left eye. This can be achieved using digital projectors with polarization filters, which project a left eye image and a right eye image with orthogonal polarisations. The correct image for each eye is then filtered out by polarization glasses the user wears, resulting in a stereoscopic effect.

The effect of combining such a 3D projector with the invention is that the virtual objects that appear to occupy the space in front of the user become completely controllable by the user. Any kind of object can be made to appear and almost any kind of manipulative process can be carried out. The possibility for the pen to be a light sabre, baseball bat or rocket launcher in an interactive 3 dimensional game environment can then be realised as the 3D tool/weapon can be made to appear where the pen is located in real space.

Figure 6:
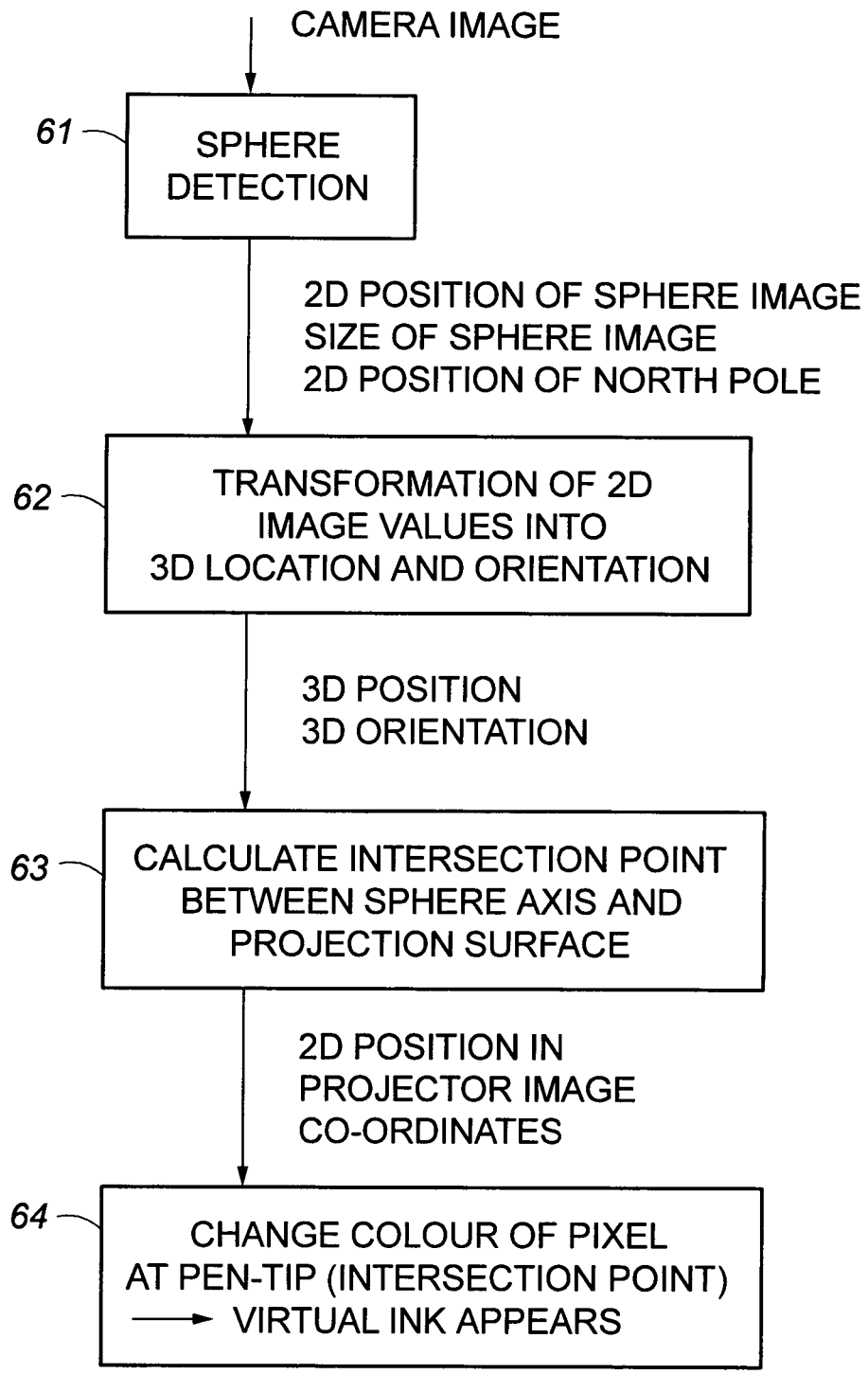
FIG. 6 is a flow chart which illustrates the operation of detection software in accordance with the present invention.

The software that allows the invention to operate as described is illustrated by FIG. 6. It runs in a loop; repeatedly taking an image from the camera as input and updating the contents of the screen/projected image. As demonstrated in the flow chart, the software executes 4 main steps between the input of the camera image and the update of the screen/projected image.

The first step 61 consists of the accurate detection of the location and size of the projected sphere image, which has the appearance of a striped or ringed pattern with an approximately circular border. The viewed configuration of the stripes varies from straight parallel lines to ellipses to concentric circles (see discussion of FIGS. 3 and 4 above). The location of the projected North pole in the camera image is detected using the pattern of these stripes.

In the second step 62 the software uses the 2D information to calculate the exact 3D location of the centre of the real sphere relative to the camera and the orientation of the sphere. As mentioned above, the distance to the sphere is determined by virtue of the relationship between the size of the sphere image and the distance of the sphere from the camera. This size determination can therefore be used to calculate the distance to the sphere in the direction of the optical axis of the camera. The location of the sphere image in the camera image in left/right and up/down direction gives the sphere's location in a vertical or horizontal direction relative to the camera in 3D. The orientation in 3D is calculated from the position of the projected North pole relative to the outer rim of the sphere image.

In the third step 63 the actual position of the tip of the pen relative to the camera is calculated. As the orientation and the location of the centre of the sphere is now known—the axis extending through the poles of the sphere and through the attached pen is known as well. The location of the pen tip can then be calculated as a point on this axis which lies at a distance from the sphere centre equal to the length of the pen plus the sphere radius. In cases where the tip of the pen does not touch the wall, the point where the axis intersects with the wall can be calculated. In both cases, a point which lies on the surface of the wall is calculated and output to the next step.

In the fourth step 64 the actual pixel in the projector, image to which the pen points is identified. From the initial calibration it is known how a point on the wall in camera coordinates relates to the pixel coordinates in the actual projected image. A simple mathematical transformation based on this information calculates the pixel coordinates. After that the pixel colour/intensity is modified if the user is drawing, or, if the user intended to click a button at the location of the pixel, the appropriate handler function in the windows system is called, identical to the way a mouse click would activate the same function.

As mentioned above, the pressing of the button on the pen which switches the illumination (and hence the image of the pattern) on and off can be used to mimic the function of a mouse button. When the button is pressed the pattern appears and the location of the pattern can be determined and a 'mouse click' at the corresponding screen location effected. A complication with this is that the pen's location cannot be detected if no button is pressed. This is only a problem in the applications where the user needs a guide as to where the pen is pointing while the button is not depressed. More complicated click information such as double click, left click, right click etc. can be transmitted by embedded encoding which switches the pattern on and off in a predefined manner if a corresponding button is pressed. Alternatively, it is possible to make use of the different colour channels of the camera and employing LEDs with frequencies which increase illumination in a specific colour channel only (as described above).

As mentioned above, where the user needs a guide as to where the pen is pointing while the button is not depressed, this functionality can be reversed whereby the illumination is on at all times but a click switches the illumination off (as discussed earlier with reference to switching from a 'pattern detected' state to a 'pattern not detected' state).

Figure 7:
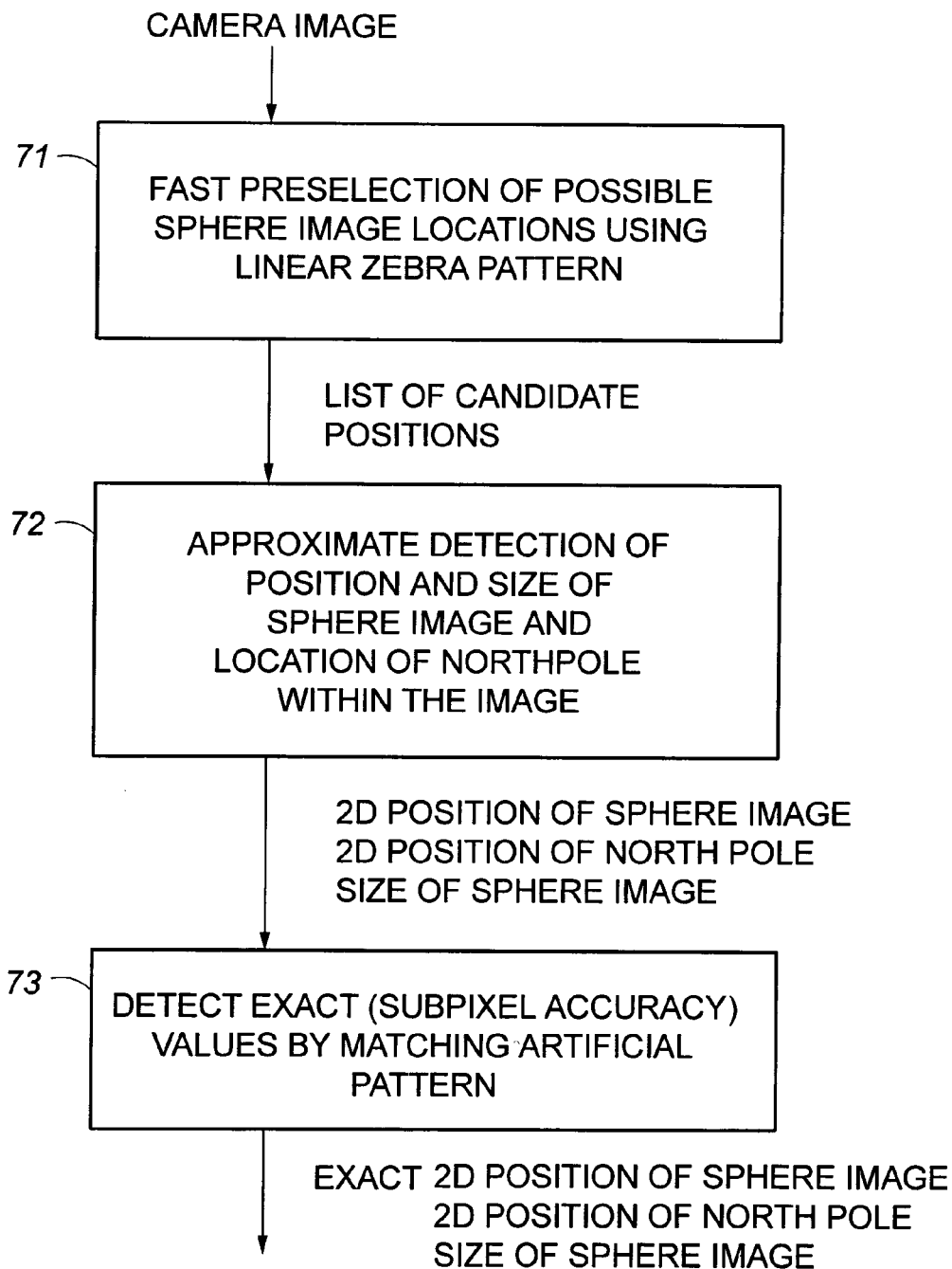
FIG. 7 is a flow chart which illustrates the operation of patterned marker detection software.

The speed, robustness and accuracy with which the parameters of the projected sphere image are detected determine the quality of the system. The flow chart in FIG. 7 describes this first step in more detail, segmenting it into 3 detailed steps.

The first step 71 consists of a fast preselection of possible candidate positions using a computationally very fast search which only detects linear sequences of black and white in either horizontal or vertical direction (as discussed above). This outputs a list of candidate positions.

In the second step 72 all the candidate positions are investigated further and the most likely one is selected. At this point, the approximate values for the location of the centre of the sphere image, the size of the sphere image and an approximate location of the projected North pole in the sphere image are also detected and output to the third step.

In the third step 73 the abovementioned detected values are refined to sub pixel accuracy by finding the parameters of the artificial pattern (e.g. FIG. 1) which provides the best correlation with the pattern in the image (FIG. 2). The exact values for the centre of the sphere image, size of the sphere image and the location of the projected North pole are returned as results of the detection routine.

For some applications it might be of advantage not to have an active light source in the pen, which allows it to be lighter and smaller and without the problem of having to replace batteries. In this case the sphere pattern can be made of alternating stripes of light reflecting material and light absorbing material. Reflective tape is one material that can be used to create the bright stripes. Such material has the property that it reflects light back in the direction where it came from. The pattern can therefore be made to appear very bright by placing a light source next to the camera. This way the advantage of reducing the necessary exposure for the camera to counteract blurring can still be enjoyed.

In the case where a visible light source is not desirable one can again use an infrared light source and material which reflects well in the infrared spectrum for the bright stripes. In this configuration the information that a button on the pen was pressed or that the tip of the pen touched a surface cannot be transmitted by the pattern as it is passive. The required functionality can be achieved by a gesture or for example by covering and uncovering (perhaps mechanically via a springloaded button), or otherwise manipulating the image of the pattern on the camera in a prescribed way.

In an alternative embodiment, it is foreseen that the surface itself may be capable of communicating contact with the tip of the pen. In this case the camera is required only to monitor the position and/or orientation of the pen while relying on an alternative source to determine said contact. One way in which this might be achieved would be to provide the screen with a high frequency alternating charge and continuously measure its capacitance—contact with (for example) a metal tip will affect the measured capacitance of the screen and detection of this change in capacitance will indicate that said contact had occurred.

For some applications it might be an advantage if the image detection can be achieved without the need for an infrared sensitive camera, e.g. so that an unmodified web camera can be used. The system works on the same principles only now visible LEDs are placed in the pen (or near the camera). In this setting the pattern detection step in the software is necessarily adapted to cope with more confusing background patterns. One way of improving this situation and to improve pattern detection is to use a sequence of unusual colours for the stripes, instead of a simple black and white sequence. The information indicating when the pen touches the wall or when a click occurs can still be transmitted by switching the light on and off (where the active light is in the pen).

An application of the invention is to a general input device for PCs which enjoys the price level and ergonomic properties of a wireless mouse yet offers the ability to monitor 6 degrees of freedom (position and orientation in 3D space)

instead of being limited to the two (up/down, left/right) typically capable of achieving with a mouse.

As mentioned above, the device can be used as an input or control device for computer gaming where it can, for example, accurately control virtual gunfire, a virtual racket, baseball bat, light-saber, magic wand, gun or any other virtual object with a defined orientation (which can be extracted by means of the techniques associated with the invention). Because the exact position and orientation of the pen can be tracked in real-time, the games can respond more accurately to player movements using the "magic pen" than existing pad-type games controllers.

A "magic pen" is foreseen and discussed herein which can write or effect mouse clicks into an image cast by a digital projector onto a wall or other suitable surface. This will allow presentations using digital projectors to become more interactive, the presenter being able to activate different links embedded in the projected image using the pen while facing the audience; browsing from slide to slide in a fashion identical to browsing between web pages, or to manipulate objects, highlight text etc. in real-time. It can also be used to browse the internet while being projected on a screen.

The "magic pen" enables the projected image to function as a white board, as the detection of the pen can be accurate enough to virtually draw or write into the projector image. For drawing purposes, the magic pen can even work like a spray paint device. The exact location and orientation of the pen can be calculated even when the pen does not actually touch the wall, the path of the sprayed paint can be calculated in 3D and virtual paint can be made to appear at the correct location. The spread of the paint can also be adjusted to match the spread of a spray paint device, e.g. wider the further the tip of the pen is from the wall. When the user wants to change the colour with which the magic pen is drawing/writing/spraying, it can be used in similar fashion to a paint brush, i.e. it can be dipped into virtual colour patches on a virtual colour palette displayed on the wall.

The magic pen application can also be scaled down to become an input method for a mobile device such as a PDA or mobile phone. Modern mobile phones and PDAs typically include cameras and in fact prototype PDAs with in-built projectors are already known at the time of the present Application.

Figure 13:
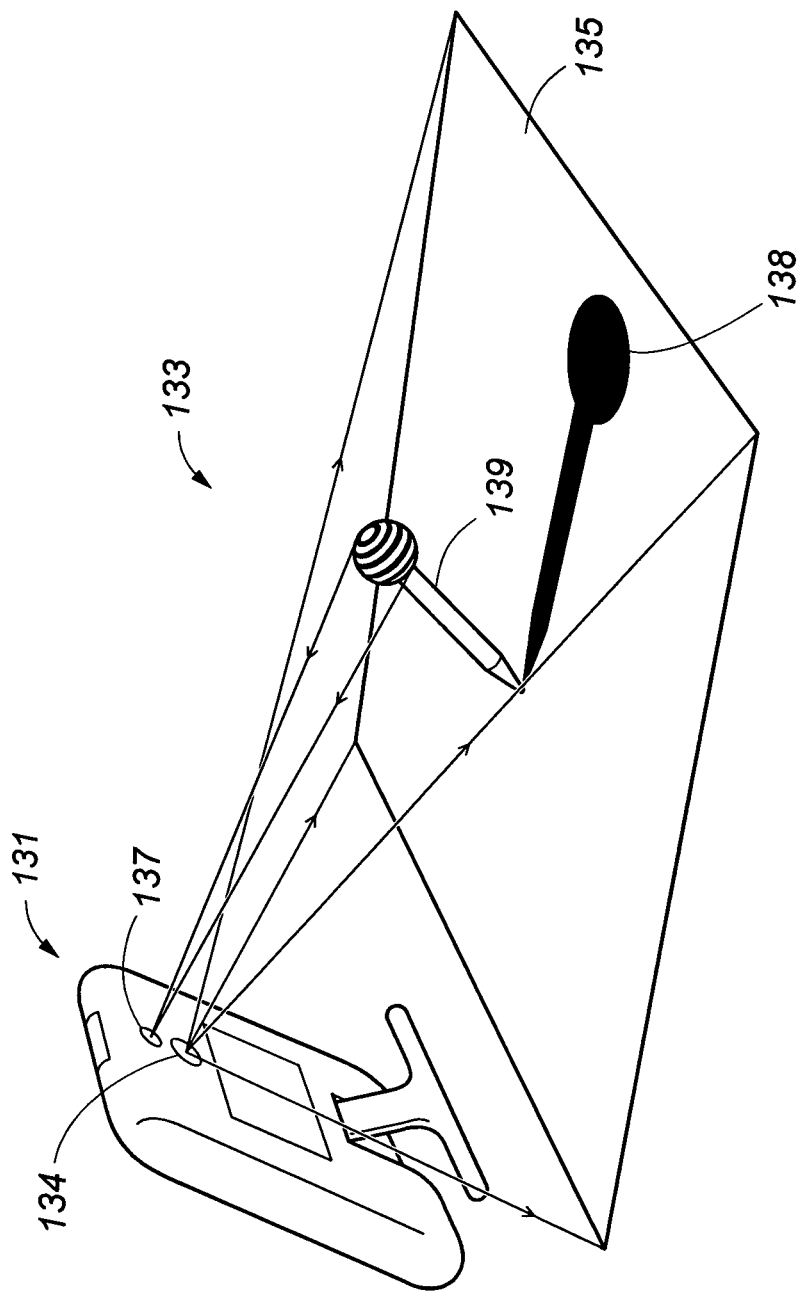
FIG. 13 demonstrates an application of the "magic pen" to use with a mobile device.

One problem identified with regard to mobile devices is that any embedded input and output devices must be necessarily small and as a result inhibit utility thereof. FIG. 13 illustrates an embodiment of the present invention wherein the magic pen functionality is extended to a PDA 131. The PDA in this example is placed on a tabletop 133 having a light surface colour and an in-built projector 134 projects an image 135 roughly the size of a sheet of paper or a computer screen onto the table top 133. The camera 137 of the device together with a suitably designed magic pen or stylus 139 in the style of a magic pen can be used to write or draw into the projected image 135 or effect mouse clicks (or stylus taps) to control the user interface of the PDA 131. It is envisaged that with sufficient computational power, memory and internet connectivity, it will be possible to carry a complete functional office around in one's pocket and set it up wherever there is a table and chair.

Note that due to the short distance between the projector 134 and the surface 133, and the large angle to the normal at which the projection is incident on the surface, a strong keystone correction is required. However, by choosing the position and direction of the projection carefully the main problem of the projection (i.e. that it can be easily obscured by the hand operating the magic pen or stylus) can be eliminated. As demonstrated in FIG. 13, the pen/stylus 139 (and a hand holding said) do not obscure or overshadow any visual content of the projection apart from an area 138 which would be obscured in any case were the image 135, for example, a hard copy or a touch screen display.

Figure 9:
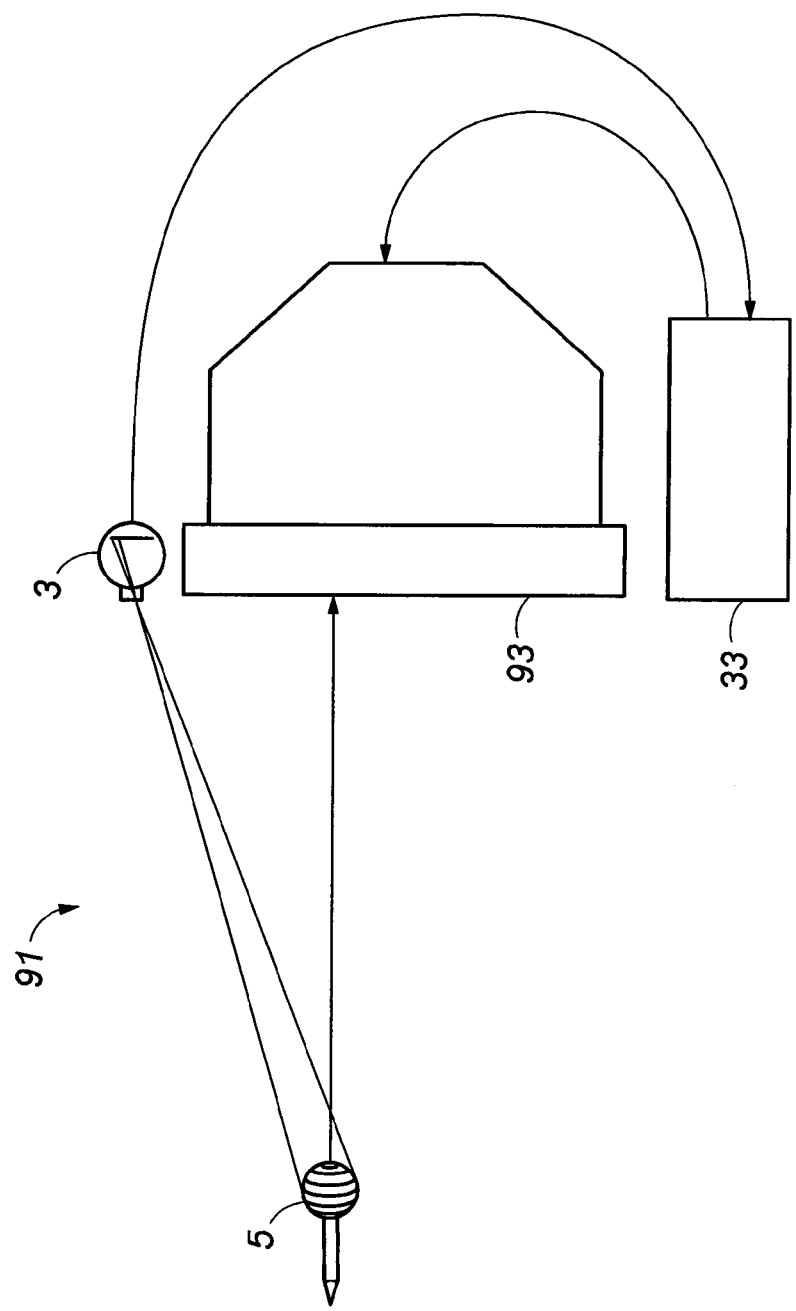
FIG. 9 shows an embodiment of the present invention employed with a monitor or TV screen.

The invention can also be incorporated into an advanced remote control 91 for a television 93, which can point at different locations on the screen 93 from a distance, making menu selection more intuitive and allowing browsing (for example) on the word wide web from the sofa via "magic pen" clicks rather than mouse clicks. This is illustrated figuratively in FIG. 9.

Another application is as an intuitive, easy to use, steering or controlling interface. The device could be used to control a robot arm, a digger or similar machinery or toy. The effector of the arm could be made to change position and orientation in accordance with the position and orientation of the handheld input device as determined in accordance with the invention.

Another related application could be for a virtual control centre: The pen could represent a whole array of dials and buttons, depending on where you hold the pen in 3d space it could adjust a different dial or actuate a particular button. Changing the setting of the dial could be effected by reorienting the pen.

Another application is for gesture recognition. As the invention can detect the actual trajectory of the pen in 3D space, it allows for a computer to recognise pointing gestures, waving gestures, writing of large letters or symbols in the air etc. which could be used for controlling machinery or appliances. The functionality of a 'magic wand' makes many HCI (human computer interface) commercial applications possible, from control of machinery, to control of objects in virtual worlds, with many applications to toys and games.

The sphere or spheres can also be placed at relevant locations on moving parts of, for example, machinery, robots, humans, animals etc. and the watching camera can then tell where the various parts are and how they are orientated relative to its own position and orientation by determining the position and orientation of respective spheres. This has potential applications in motion capture technology for games, or perhaps to produce a computer model illustrative of real-time behaviour of a piece of apparatus, and may also be useful to control the apparatus with an appropriate feedback arrangement.

The sphere without attachments can be thrown into the air or bounced around surfaces and its exact trajectory and spin can be detected, which might be useful to gather detailed information about the medium the sphere moves through, for example, viscosity, turbulence etc. It could be used to calculate the geometry, motion or elasticity of a surface, from the way the sphere bounces off the surface.

Figure 11:
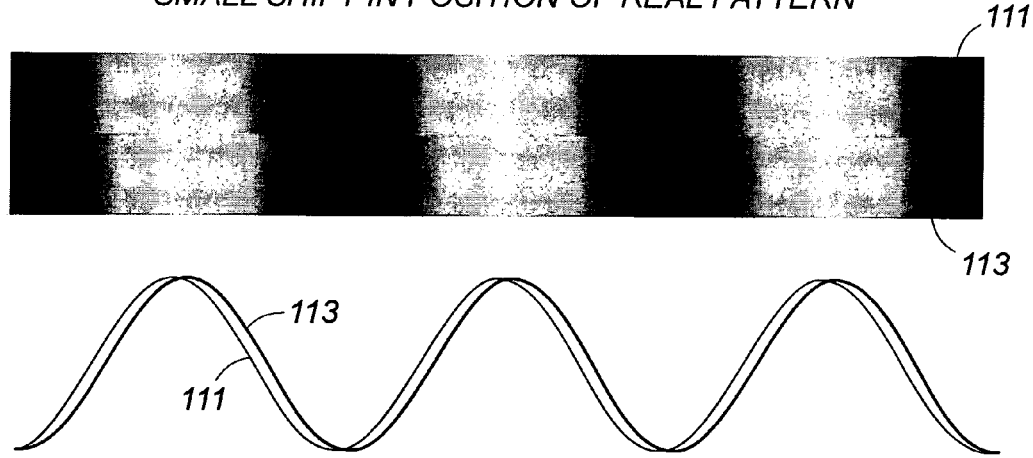
FIG. 11 demonstrates how sub-pixel accuracy can be achieved by matching a continuous pattern to a pixellated pattern.
Figure 11:
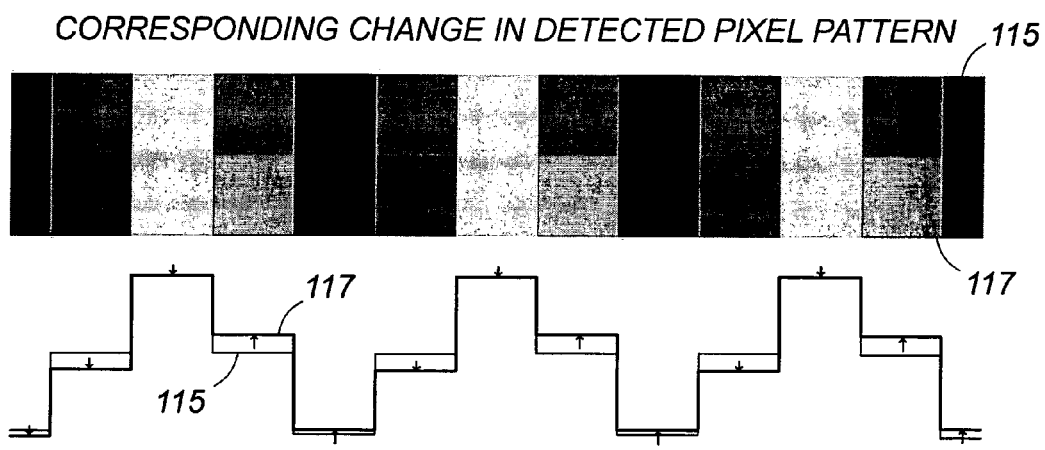
Figure 11:
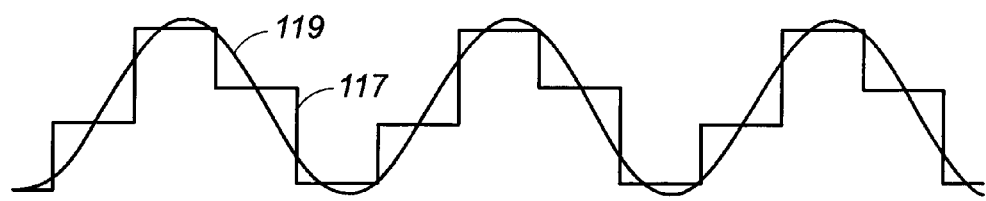
Figure 12:
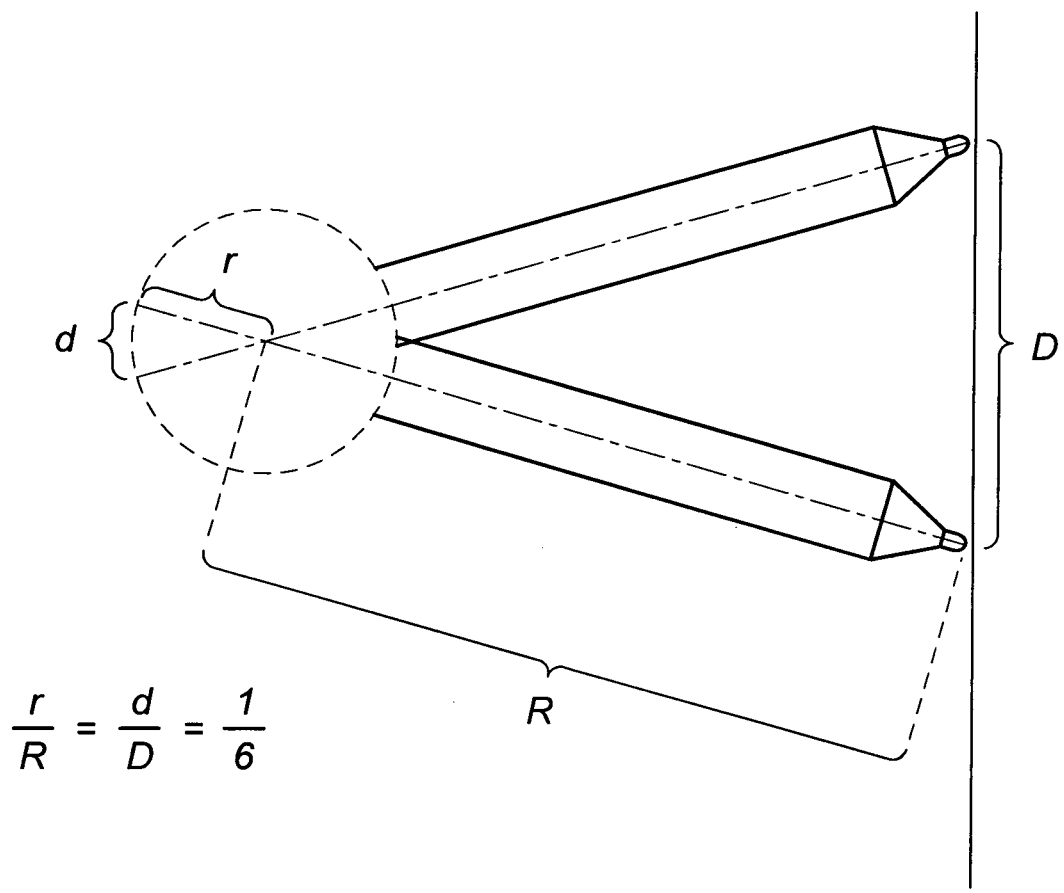
FIG. 12 illustrates how a relatively small shift in the pattern on a spherical marker can correspond to a much larger shift in the position of the tip of the pen.

With reference to FIGS. 11 and 12, the accuracy requirements and how these are met shall now be discussed.

Using a standard camera such as a webcam a typical resolution achievable at video frame rate is about 640 pixels across the width of the camera image. A reasonable active writing area in a projected image would be on the order of 1 meter. Assuming that the field of view of the camera is adjusted to match this area, the width of a single pixel in the camera image will therefore correspond to a distance of more than 1.5 mm on the screen.

From an ergonomic point of view it is also reasonable that the patterned marker will extend not further than about a sixth of the entire length of the pen in each direction from the back of the pen, such that the diameter of the patterned marker will be less than a third of the pens length.

Now as illustrated in FIG. 12, in a worst case scenario changing the orientation of the pen such that the tip of the pen shifts by a distance D across the surface, means that the pattern on the back of the pen shifts only by d, which is a ⅙ of D.

This means that to detect a displacement of the pen tip of less than 1.5 mm, the shift of the pattern at the back of the pen in the camera image needs to be detected at a resolution better than ⅙ of a pixel. If the active writing area were to be expanded to 2 meters instead of 1 meter, the resolution required must be better than 1/12 of a pixel. Furthermore this has to be achieved in a way which is robust against a certain amount of noise and blurring in the camera image.

The patterned sphere approach is characterized by the use of a single light diffusing sphere with a special concentric, wavelike banded pattern and a method of extracting the position and orientation of this sphere from its pixelated appearance in the camera image (e.g. FIG. 2) by way of matching it with a parameterized continuous artificial pattern in continuous (non pixelated) image space.

The effectiveness of the approach is due to the following reasons. The area the pattern covers in the camera image is always a well defined simple disk (or slight ellipse) independent of the orientation and position of the pen. The skilled man will realise that detection of disks or circles in images can be achieved algorithmically very easy and fast due to the simplicity and symmetry of this shape.

The spherical shape also extends the detection range for the orientation to the maximum of 360 degrees. A flat pattern, which has been adopted in some previously known systems, will diminish to a line in the view of the camera when its orientation is changed by 90 degrees. Note that the extended range in orientation is an important requirement for the pen application, as the orientation of a pen when in use can vary in the range between approx +80 and −80 degrees from the surface normal.

In general the large detection range for the orientation not only has advantages for the object to be detected at a wide range of orientations, but also allows the camera, which monitors the device to be placed at any angle to the device, which is of advantage for applications where the camera might be suspended from the ceiling or attached to a nearby side wall. It also allows the same device to be detected from several cameras at different angles to gain robustness against occlusion or redundancy to increase the accuracy of the detection.

The translucent parts of the sphere all appear equally bright in the camera image despite the curvature because the diffuse surface approximates a Lambertian source, which means that each point on the surface radiates the same amount of energy in all directions, such that there is no spherical shading or highlights as one would expect if the sphere was illuminated from a distant light source. As a result, the sphere appears as a flat disk in the camera image from every direction.

The areas on the surface of the sphere where light is blocked also result in areas of constant low intensity on the disk in the camera image. This means the bands on the sphere create low-high intensity transitions with stable minimal and maximal brightness and stable gradients in between, all across the surface of the disk image. This greatly improves the effectiveness of any algorithm used to detect the pattern.

The diameter of any marker shape used to transmit the location and orientation information must be traded off against marketability and ergonomics and any hand held device should be as small and inconspicuous as possible. A spherical marker provides maximal coverage for a particular diameter which allows the maximum amount of pixels to be used for an accurate match of the pattern. Also a spherical shape is generally considered aesthetically one of the most pleasing due to its symmetry.

For subpixel resolution it is not sufficient to estimate the pattern's location from the difference in location of high intensity and low intensity pixels alone but also from the actual fine variation in pixel intensities. See FIG. 11 for an illustration where a small shift (from 111 to 113) of the real pattern results in a corresponding change (from 115 to 117) in the pixellated image. An artificial continuous pattern 119 can be fitted to the new detected pixel pattern 117 to determine the actual new real pattern 113.

A pixel which covers part of a low-high intensity transition will likely have a slightly higher or lower intensity than the half-way intensity depending on whether the pixel location lies a bit further towards the higher or the lower end of the transition. This means the intensity values of the discrete pixels preserve information about the sub pixel position of the pattern in continuous space. It can be shown mathematically that the exact position, even if subpixel, of a continuous regular wave pattern can be recovered from its pixelated equivalent using a suitable matching algorithm, which guarantees arbitrary accuracy in the case where there is no noise and a flawless pattern on the sphere.

The method is still able to deliver good subpixel accuracy in the presence of noise as the matching algorithms can make use of the redundancy of information about the pattern's subpixel position which is present in the many edge overlapping pixels in the extended area of the pattern. As the error introduced by noise is random it has the tendency to cancel itself out over many pixels and the exact pattern position can still be recovered.

If the user rotates the pen around the long axis keeping everything else the same, then the tip of the pen will still point at the same position. This rotation is therefore a natural symmetry of the system. Using concentric bands on the sphere creates a pattern which also does not change when the pen is turned around its long axis. By making the pattern invariant to these rotations the detection calculations simplify considerably and become numerically more stable, further they are by definition guaranteed to produce the same 3d location for the pen tip independent of rotation.

The invention herein disclosed provides substantial advantages over the prior art and known "smart" boards and the like. This "Magic Pen" technology allows a user to write naturally into a projected image, without the need for a touch sensitive surface or any other additional equipment apart from a single camera and, in one particular embodiment, a special kind of spherical patterned marker at the back end of a pen which is illuminated in infrared when the pen tip touches the drawing surface. The illuminated pattern is monitored by the camera which is positioned at a location near the projector and the recorded images are analysed with a computing device that alters the image produced by the projector accordingly. It has been discovered that a user will naturally maintain a line of sight between the projector and the pen in order to see what he is writing or drawing. This means he will also automatically avoid obstructing the view of the camera onto the pattern, as would otherwise be the case when the camera is placed near the projector.

Typical smart boards combine a large touch sensitive screen with a projected image to achieve interactivity. The extended rigid board with its dedicated electronics makes this solution expensive and cumbersome. As no expensive equipment is required to implement the present invention, this kind of technology can be made available at a much reduced price point and with much simpler installation and maintenance.

Another advantage of the "Magic Pen" over such smart boards, apart from the reduced cost and no requirement for additional costly hardware, is the fact that the location and orientation of the pen may be known even if it is not touching the surface. As such, the present invention can also be used to simulate a spray gun as paint impact position, impact angle and the intersection of the spray cone with the surface can be accurately determined.

Although the invention shows great benefit in the above "Magic Pen" and spray gun applications, it is by no means restricted to these. In the most general sense the invention represents a new 6 degrees of freedom real time computer input device, which makes it possible to accurately trace free motion and rotation of any pointing device in 3 dimensional space. Most notable other applications are in computer gaming where the device can be used to represent virtual, swords, shields, baseball rackets, wands, guns etc.

The general advantages of the invention lie in the amount of, and the speed at which, information can be gained from the pattern on the marker. Full 3d position and 3d orientation can be determined at video frame rates on standard PC hardware with at least standard web camera functionality; with an additional bit of information (e.g. infrared illumination on contact) effecting a mouse click. There is also potential for another at least 3 bits encoded into a secondary pattern. Degree of speed, accuracy and range at which this information can be gained are high enough (at least) to allow the "Magic Pen" application to work without noticeable difference from the handling of a normal white board marker.

Within a range defined by the optical limits of the camera and the limits of its resolution the method allows orientation and position to be detected to theoretically arbitrary accuracy for the noiseless case with a perfectly manufactured pattern. This is true despite the pixelated representation of the pattern in the camera image (see for example FIGS. 2 and 11, and the accompanying description above). Within the range limit orientation can be detected to the full 360 degrees around at least two of the three rotational axis. Rotation around the $3^{rd}$ axis (i.e. the axis along the length of the pen) can be determined using a secondary pattern.

The patterned marker can be produced to a small size, with low weight, and have both aesthetic and ergonomic appeal. As discussed in detail above, the marker itself can be a hollow sphere made from a light weight material.

The present invention also benefits significantly from inherent scalability. It will be relatively easy to extend the range of detection by, for example, either combining several standard cameras or a single high resolution camera with a wider field of view to monitor a greater range of space within which the marker is manipulated. It is also easy to use several patterned spheres at the same time, as they can be identified as separate devices using the secondary pattern. This is of great advantage for the "Magic Pen" embodiment as the size of the projected image is also easily scalable simply by increasing the distance between the projector and the screen. This permits other foreseen applications where it can be envisaged that several people/children can draw on a large surface at the same time.

Using an infrared LED as discussed, and activating the infrared LED on contact means that such a device exhibits low power consumption and therefore can enjoy long battery life. Furthermore, such a device can be manufactured at low cost due to the ready availability of components, and simple nature of the product.

In summary, the invention can be implemented with a single low cost web camera and a single sphere with a very simple pattern. The implementation of the method on a computer has low requirements for computational resources such as RAM, hard disk space and only moderate demands on processing speed.

Significant advantages of the system are described herein, and provide functionality and application over other interface devices in terms of cost and versatility. The invention does not require any complex electronics, ultrasonic sensors/receivers, touch sensitive surfaces, etc., but can make use of off-the-shelf, mass produced webcams (adapted for infrared usage). The interface device itself is low cost, as table tennis balls (from which an embodiment of the invention may be constructed) and infrared LEDs are all cheaply bought.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims. For example, where the sphere has been discussed in detail as comprising a series of stripes, any recognizable surface pattern may be adopted. Furthermore, an advantageous employment of modified webcams has been described, but any suitable camera may be employed, for example a dedicated high resolution infrared imaging camera.

The invention claimed is:

1. An object position and orientation detection system comprising:
    an object, at least part of which comprises a patterned marker having a detectable pattern;
    imaging means adapted to create one or more two dimensional images of the object;
    image processing means comprising software which models the imaging means and the object in three dimensions, and which artificially generates a two dimensional image representing a projected image of the modelled three dimensional object, including the patterned marker, on a sensor of the modeled imaging means for any position and orientation of the object in three dimensions in the field of the imaging means; and
    the image processing means adapted to calculate the position and orientation of the object in three dimensions by matching in real time the pattern in at least one of the two dimensional images of the object with the pattern in the artificially generated two dimensional pattern image;
    wherein the object comprises a computer input device, and the pattern as viewed by the imaging means changes from one geometric entity to another dependent on the orientation of the patterned marker relative to the imaging means;
    wherein matching the pattern comprises fine-tuning the position and orientation of the modelled three dimensional object until the pattern in the artificially generated, two dimensional image matches best with the pattern in the at least one of the two dimensional images, in order to facilitate tracking of the object as it moves and thereby enabling accurate tracing of free motion and rotation of the computer input device.

2. A system as claimed in claim 1, wherein the patterned marker is substantially spherical.

3. A system as claimed in claim 1, wherein the patterned marker comprises a single sphere.

4. A system as claimed in claim 1, wherein the pattern is periodic.

5. A system as claimed in claim 2, wherein the pattern on the substantially spherical patterned marker comprises a set of rings around the substantially spherical marker which create a variety of patterns depending on the orientation of the substantially spherical marker with respect to the imaging means.

6. A system as claimed in claim 1, wherein the patterned marker is hollow with a surface adapted to diffuse light.

7. A system as claimed in claim 6, wherein the surface comprises celluloid.

8. A system as claimed in claim 6, wherein the surface of the patterned marker and the material from which the marker is made have the same reflective properties but different transmission properties.

9. A system as claimed in claim 1, wherein the pattern is enhanced by illuminating it with a point light source which is positioned behind the patterned marker.

10. A system as claimed in claim 9, wherein the light source provides infrared illumination.

11. A system as claimed in claim 1, wherein the imaging means comprises a single camera.

12. A system as claimed in claim 11, wherein the imaging means comprises a web camera.

13. A system as claimed in claim 9, wherein the imaging means is provided with an optical filter selected to prevent the imaging means from receiving electromagnetic radiation at frequencies other than those provided by the light source.

14. A system as claimed in claim 9, wherein the pattern is not detectable when the light source is switched off, the switching being used to communicate information to a computer system.

15. A system as claimed in claim 1, wherein the pattern on the marker consists of concentric bands around an axis through the marker and the pattern does not change if the marker is turned around said axis.

16. A system as claimed in claim 1, wherein matching the pattern comprises defining a similarity measure between the pattern in the artificially generated two dimensional image and the pattern in the at least one of the two-dimensional images, and fine tuning the match using gradient based methods using the gradient of the similarity measure.

17. A system as claimed in claim 16, wherein the gradient based methods are carried out on parameters corresponding to the position and orientation of the model to fine tune the match to sub pixel accuracy.

18. A system as claimed in claim 1, wherein the object is a non-planar object.

19. A system as claimed in claim 18, wherein the object is substantially spherical.

* * * * *